United States Patent
Kossner et al.

(10) Patent No.: US 7,037,098 B2
(45) Date of Patent: May 2, 2006

(54) DEVICE FOR PRODUCING PLASTIC PIPES

(75) Inventors: Hubert Kossner, Schwanfeld (DE); Dietmar Pfennig, Rödelsee (DE)

(73) Assignee: Unicor Rahn Plastmaschinen GmbH, Hassfurt (DE)

( * ) Notice: Subject to any disclaimer, the term of this patent is extended or adjusted under 35 U.S.C. 154(b) by 317 days.

(21) Appl. No.: 10/467,192

(22) PCT Filed: Feb. 12, 2002

(86) PCT No.: PCT/DE02/00493
§ 371 (c)(1),
(2), (4) Date: Aug. 5, 2003

(87) PCT Pub. No.: WO02/066229
PCT Pub. Date: Aug. 29, 2002

(65) Prior Publication Data
US 2004/0062829 A1 Apr. 1, 2004

(30) Foreign Application Priority Data
Feb. 16, 2001 (DE) ................. 101 07 191

(51) Int. Cl.
B29C 47/06 (2006.01)
(52) U.S. Cl. ............... 425/133.1; 425/380; 425/326.1
(58) Field of Classification Search ............ 425/381.2, 425/133.1, 380, 326.1
See application file for complete search history.

(56) References Cited

U.S. PATENT DOCUMENTS

| 3,743,456 | A |   | 7/1973  | Cini |
|-----------|---|---|---------|------|
| 3,809,515 | A | * | 5/1974  | Farrell .................... 425/133.1 |
| 4,201,532 | A | * | 5/1980  | Cole ........................ 425/380 |
| 5,261,805 | A | * | 11/1993 | Gates ...................... 425/72.1 |
| 5,460,771 | A |   | 10/1995 | Mitchell et al. |
| 5,651,935 | A | * | 7/1997  | Matsukura et al. ......... 264/503 |
| 6,749,413 | B1| * | 6/2004  | Fare' ....................... 425/72.2 |

FOREIGN PATENT DOCUMENTS

| DE | 27 52 932 | 9/1980 |
| DE | 37 37 588 | 1/1991 |

* cited by examiner

Primary Examiner—Joseph S. Del Sole
(74) Attorney, Agent, or Firm—Bachman & LaPointe, P.C.

(57) ABSTRACT

An apparatus for producing seamless plastic tubes comprises an injection head to which molten plastic material is fed by an extrusion device. The injection head has a plate-shaped distribution device 13a, 13b having an intake opening 20 into which the feed passage 17a, 17b for the molten plastic material opens. In the distribution device, distribution passages 14 extend in a star configuration from the intake opening 20 and extend perpendicularly to the axis of the injection head, wherein each distribution passage 14 has a straight radial passage portion 14r and three branch passages 14z which branch therefrom and which each go into arcuate passage portions 14k which, in the region of the periphery of the distribution device, communicate with the annular gap 25 of the injection head, with the adjacent ends at a respectively identical angular spacing, and they each introduce a respectively identical volume flow into the annular gap 25.

25 Claims, 5 Drawing Sheets

—— Flow passage for the outer layer
---- Flow passage for the inner layer

— Flow passage for the outer layer
--- Flow passage for the inner layer

— — — Flow passage for the outer layer
— · — Flow passage for the inner layer

DEVICE FOR PRODUCING PLASTIC PIPES

BACKGROUND OF THE INVENTION

The invention concerns an apparatus for producing seamless plastic tubes.

Apparatuses of that kind having an injection head with a distribution device with distribution passages extending perpendicularly to the axis of the mould cavity have the advantage that the injection head on the one hand can be designed so as to be of a short structural length and on the other hand can also be designed to be of small diameter, so that the distribution device which is preferably in the form of a plate can be arranged within the cross-section of the mould cavity. By virtue of the short structural length of the injection head, the feed passage for the molten material can be of relatively large diameter over a large part of its length, so that it is possible to operate with comparatively low pressures, but nonetheless sufficient molten material is fed to the annular gap or the annular gaps which are arranged in succession in the production direction.

An injection head of that kind is known from DE 198 35 189 A1. The distribution passages of that so-called plate injection head are in the form of passages which are branched in a tree-like configuration. To provide those passages, suitable grooves are formed in a distribution plate, the grooves being covered by way of a cover plate. A disadvantage here by virtue of the distribution passages which are branched tree-like is that the variability of the number of distribution passages or the variability of the degree of branching of the distribution passages is restricted to stages which form powers of 2, and thus a stepless variation is not possible. A further fundamental structural limitation arises out of the fact that the distribution passages, in accordance with the concept of DE 198 35 189, must each of exactly the same length in order to ensure identical flow paths, in order finally to guarantee a homogeneous composition for the plastic extrusion issuing at the annular gap.

In addition DE 27 52 932 discloses an apparatus with a plate injection head. In that apparatus the plate injection head has a distribution plate with radial grooves which are arranged substantially in a star shape and which, covered by a cover plate, form distribution passages which are radial in a star shape. The molten plastic material is fed to the distribution plate by way of an annular gap which is concentric with respect to the central axis of the mould cavity. The molten material is fed by way of the star-shaped distribution passages to the annular gap arranged at the outer periphery of the distribution plate, the annular gap having a turning distributor integrated therein. In order to achieve an improved distribution effect, the embodiment illustrated in DE 27 52 932 provides that the star-shaped distribution passages which extend from the inner annular gap open into an annular distribution passage, from which further radial distribution passages of an increased number issue in a radiating configuration. That annular distribution passage does not guarantee homogeneous, trouble-free distribution. In addition, disadvantages arise out of the fact that space for feeding the molten material and for possible supply conduits must be present exclusively on the central axis within the annular feed gap, in a concentric arrangement. A further disadvantage is that, in order to ensure flow paths which are each of equal length, the entire arrangement must be of a strictly symmetrical configuration, with respective passage portions of identical length, around the central axis.

U.S. Pat. No. 3,809,515 discloses an injection head which is admittedly not in the form of a plate injection head but which already has distribution passages extending perpendicularly to the central axis. The distribution passages are directed radially with arcuate end portions which open in the manner of a turning distributor into the outer annular gap. The variability in the degree of distribution is limited on the one hand by the radial orientation of the passages and on the other hand by the configuration of the turning distributor adjoining same. A further substantial limitation is that, in accordance with the concept disclosed in U.S. Pat. No. 3,809,515, the flow paths in the distribution passages must be of exactly the same length in order to ensure a homogeneous volume flow.

An injection head which is known from U.S. Pat. No. 3,743,456 and which is also not in the form of a plate injection head also already has distribution passages extending perpendicularly to the central axis. They are arranged in the manner of a cross and open directly into the outer annular gap. In this case also, the degree of distribution is limited as only a limited number of exclusively radial passages are structurally possible, in the cross-section involved.

The object of the present invention is to develop an apparatus of the kind set forth in the opening part of this specification, in such a way that a composition of maximum homogeneity of the jet of molten plastic material issuing at the annular gap of the injection head is achieved.

SUMMARY OF THE INVENTION

The foregoing object is achieved by the present invention wherein an apparatus for producing seamless plastic tubes is provided which comprises at least one extrusion device, at least one injection head connected downstream of the extrusion device in the production direction, with at least one annular gap which is preferably in the form of a circular ring, and at least one mould cavity which is connected downstream of the injection head in the production direction and which is formed for example by travelling corrugator jaws and which is preferably coaxial with the annular gap, for shaping the plastic tube from at least one flow of molten plastic material which issues from the annular gap of the injection head, wherein it is provided that the injection head has a preferably plate-shaped distribution device which is arranged preferably within the cross-section of the mould cavity and which has an intake opening into which a feed passage for the molten plastic material opens, wherein the distribution device has a plurality of distribution passages which extend preferably in a star configuration from the intake opening and which extend substantially perpendicularly to the axis of the mould cavity and/or the annular gap, wherein each distribution passage has a preferably straight, radial passage portion which extends from the intake location and preferably branch passages which extend from a branch location at the end of the radial passage portion, wherein the total of n ends of the distribution passages open in the region of the periphery of the distribution device into the annular gap at a respectively identical angular spacing between adjacent ends at an angle of 360°/n, forming n flow paths which each extend from the intake opening in mutually adjoining passage portions of the distribution passages to open into the annular gap and introduce respectively equal volume flows into the annular gap, characterised in that at least two of the flow paths are of different lengths and to ensure an equal volume flow is introduced into the annular gap (25, 4, 7) the configuration of the passage portions (14z) associated with those two flow paths is different in terms of the flow cross-section, in particular the passage diameter.

Provided in the distribution device of the injection head is a multiplicity of distribution passages in which there is a given number of flow paths for the molten plastic material depending on the respective degree of branching of the distribution passages, wherein each flow path extends from the intake opening into the distributor to the mouth opening of the distribution passages into the annular gap. In the case of a branched passage there is a number n of flow paths corresponding to the number of branch passages. What is essential in the structure is that the structural arrangement and configuration of the branch passages, starting from a common intake opening, can be of a relatively free configuration. It is possible for that design configuration to be optimally adapted to the amount of space available and the spatial conditions in the distributor without having to take care to ensure that all flow paths are of the same length. In order to ensure, in spite of flow paths of different lengths, that a respectively equal volume flow is fed to the annular gap by way of the ends of the distribution passages, which open at the annular gap, it is provided that the flow resistance in the distribution passages through which the material flows for the individual flow paths, that is to say the flow resistance of the passage portions, through which the material flows in succession, of the respective distribution passages, is of a suitably different nature, in regard to different flow paths. For that purpose the inside diameters of the passage portions through which the material flows in the case of the different flow paths can be designed differently, in dependence on the length of the respective flow path.

In that way it is possible for the degree of branching of the distribution passages to be selected to be as may be desired. Each distribution passage may have one or more branch locations, from each of which two or more branch passages respectively extend. In that respect the distribution passages can differ in terms of their degree of branching and in terms of the length of the passage portions and the individual flow paths from the intake opening to the mouth opening into the annular gap can be of different lengths. The individual passage portions can involve any curved shapes but for manufacturing reasons are preferably in the form of straight passage portions. Preferably the end portions of the distribution passages prior to their mouth opening into the annular gap make a transition into passage portions in the form of an arc, preferably a circular arc, which can be arranged in the manner of a turning distributor and pass the molten plastic material into the annular gap.

In preferred embodiments the intake opening into the distributor is in coaxial relationship with the axis of the mould cavity or the axis of the annular gap which is preferably in the form of a circular ring. The intake opening into the distribution device however may also be arranged eccentrically and it is also possible to arrange a plurality of intake openings, preferably in a common plane in the distribution device.

The structure provides a multiplicity of distribution passages which respectively branch at at least one branch location, forming at least two branch passage portions in each case. The arrangement of the distribution passages is star-shaped from the central intake opening in the distribution device. It is essential that the first passage portions of the distribution passages, which extend radially from the intake opening, are each straight and those straight radial first passage portions at their ends each have a respective branch location at which they branch into at least two branch passage portions. In that respect the arrangement is symmetrical in a star configuration, extending from the intake opening. The distribution passages finally form a transition, possibly after repeated further branching, to constitute end portions which are in the form of an arc and preferably a circular arc and which feed the molten plastic material to the annular gap in the manner of a turning distributor. Insofar as the branch locations in the distribution passages disposed in a star configuration are arranged on a concentric line around the intake opening and branching to constitute more than two branch passages occurs at the branch locations, that arrangement affords different lengths for the flow paths through the branch passages of a distribution passage, in constructions in which the branch passages open on a concentric line into end portions of equal length which lead to the annular gap. That is the case if the branch passages form a transition directly into the arcuate passage portions of the turning distributor. In specific embodiments, compensation in respect of those flow paths of different lengths can be effected by the adjoining passage portions, for compensation purposes, involving a respective corresponding longer or shorter flow path. It is possible in that way to provide that the total flow path of the mutually adjoining passage portions between the intake opening and the opening communicating with the annular passage is of equal length in each case. In other embodiments the compensation for the flow paths of different lengths can be effected in that the flow resistance is suitably different in the passage portions through which the material flows in the course of the various flow paths, so that ultimately in spite of flow paths of different lengths, the same respective volume flow is fed to the annular gap at the opening communicating with the annular gap.

In preferred embodiments the radial first passage portion at the branch location branches into more than two branch passage portions, preferably forming three passage portions. The passage portions are preferably in the form of straight passage portions and are arranged symmetrically with respect to the axis of the radial first passage portion. Preferably the middle one of three branch passage portions is arranged in alignment in a straight line with the radial first passage portion. By virtue of the respective straight configuration of the passage portions and the branching to afford a multiplicity of branch passage portions, this arrangement involves a high degree of distribution. This applies in particular in regard to constructions in which all distribution passages extending from the intake opening are designed in that same manner and the arrangement therefore involves symmetry, preferably as a star structure.

A particularly compact arrangement is achieved with structures in which it is provided that the distribution device has a distribution plate in which the radial first passage portions are in the form of bores preferably extending parallel to the plane of the plate. The branch passage portions can also be in the form of bores extending parallel to the plane of the plate. This means that the distribution passages in those portions are respectively formed by bores extending parallel to the plane of the plate. Alternatively the bores can also be in the form of grooves which are made into corresponding passages by the provision of one or more cover plates lying thereon.

In preferred developments the distribution device can have a first distribution plate and a further distribution plate, wherein portions of the distribution passages and more specifically preferably the arcuate passage portions are arranged in that further distribution plate. The further distribution plate can be in the form of an annular distribution plate, in design configurations which are of a particularly simple structure. The arcuate passage portions can be arranged in the annular distribution plate. The intake opening and the radial first passage portions and preferably also the branch passage portions can be arranged in a central distribution plate which is arranged surrounded by the annular distribution plate. A particularly compact arrangement is provided if the central distribution plate and/or the annular distribution plate has or have a concentric stepping and the two plates are arranged to lie one upon the other in complementary relationship in regard to the stepping. In this case the outer annular step edge of the central plate can engage over the outwardly arranged annular distribution plate and rest thereon. To provide the arcuate passage portions, the outer annular distribution plate can have arcuate grooves therein, which are covered by the annular step edge of the central plate, thus providing the arcuate passage portions.

Particularly compact design configurations with injection heads having a plurality of distribution devices arranged in succession in the production direction are achieved when the intake opening is arranged centrally in the distribution device, if the distribution device eccentrically has an aperture therethrough for a feed passage for molten plastic material to a distribution device connected downstream thereof in the production direction. In addition the distribution device may also include at an eccentric position an aperture for supply devices, for example a conduit for air, power, coolant and so forth.

BRIEF DESCRIPTION OF THE DRAWINGS

Further features, details and advantages of the invention will be apparent from the description hereinafter of an embodiment by way of example of an apparatus for the production of double-wall corrugated tubes with reference to the drawing in which:

FIG. 1 diagrammatically shows at 1 the correspondingly corrugated inside wall of a corrugator moulding jaw, wherein a plurality of corresponding moulding jaws occur in direct succession in the production direction 2 of the corrugated tube. The contact surface of two moulding jaws is indicated by the line 3 in FIG. 1.

DETAILED DESCRIPTION

Figure 1:
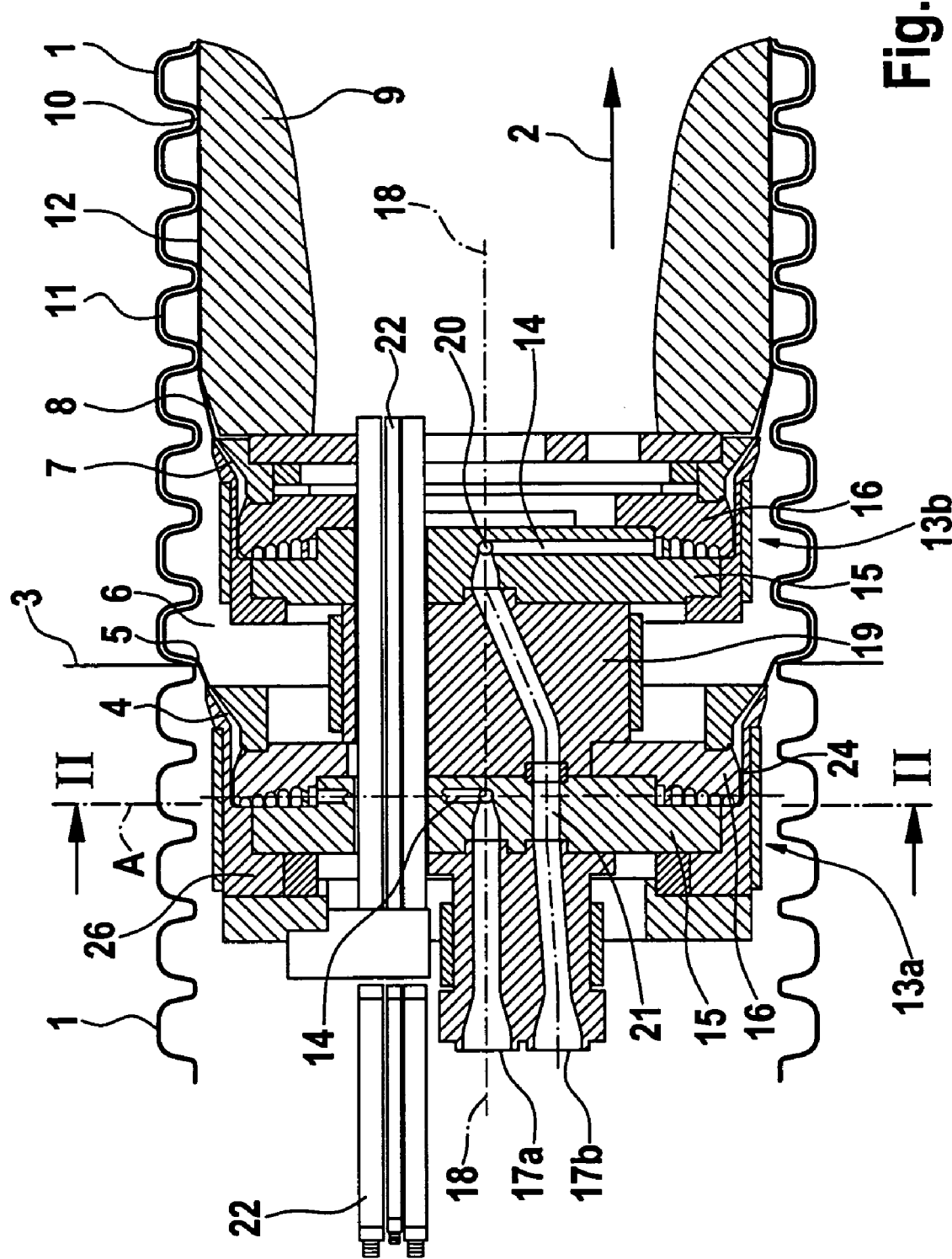
FIG. 1 is a diagrammatic view in longitudinal section showing the region of an apparatus for producing double-wall corrugated tubes, in which the molten plastic material issues from distribution devices and is shaped to form a corrugated tube in corrugator moulding jaws.

The production of the multi-wall corrugated tube is effected in per se known manner, by a procedure whereby a first tubular flow 5 of molten plastic material issuing from an annular gap 4 is applied by suitable means, for example an increased pressure applied in the space 6, against the inside wall 1 of the corresponding moulding jaw which moves uniformly in the production direction 2. The annular gap 4 is then followed in the production direction 2 by a further annular gap 7 from which a tubular flow 8 of a molten plastic material also issues. That molten plastic material tube is pressed against the regions 10 of the outside wall 11 of the corrugated tube to be formed, by a bar or mandrel 9, the precise configuration of which is dependent on the respective plastic material used and the specific tube shape and so forth, and is therefore not described in greater detail here. The temperature during the operation of pressing the inner tube 8 of the corrugated tube against the outside wall 11 is so selected that welding of the outside wall 11 and the inside wall 12 takes place in the regions 10, thus producing a corresponding corrugated tube with a ribbed outside wall 11 and a smooth inside wall 12. In regard to the formation of the corrugated tube itself, the apparatus diagrammatically shown in FIG. 1 completely corresponds to the state of the art.

The essential difference between the apparatus shown in FIG. 1 and the state of the art is to be found in the way in which the molten plastic material is fed to the annular gaps 4 and 7.

It will be seen from FIG. 1 that, for that purpose, the arrangement has two distribution devices indicated generally by references 13a and 13b respectively. Those two distribution devices are basically of the same structure. It will be noted however that the diameter of the annular gap 4 for the outside wall 11 in the illustrated embodiment is somewhat larger than the diameter of the annular gap 7 for the inside wall 12 and in a corresponding manner the diameters of the distribution devices 13a and 13b are also somewhat different. That is necessary in order to ensure that the outside wall 11 of the plastic corrugated tube, which already bears against the inside wall 1 of the moulding jaws, does not come into contact with the distribution device 13b.

Each of the distribution devices 13a and 13b includes two plate-shaped elements which are each of a circular configuration in external contour, namely a disc-shaped first plate 15 which has bores serving as portions of distribution passages 14 and provided within the plate 15 parallel to the plane of the plate, and a second plate 16 which is in the form of a circular ring in plan and which has groove-shaped recesses which are covered by the disc-shaped plate 15 lying thereon in the region of the groove-shaped recesses and which thus join the bores in the plate 15 and thus complete the distribution passages 14. The peripheral surface 24, which is circular in plan, of the first plate 15 is surrounded at a small spacing, with the formation of an annular gap 25, by an outer ring 26 whose cross-section can be seen from FIG. 1.

The two distribution devices 13a, 13b are thus composed of the plate-shaped and ring-shaped elements 15, 16, 26 respectively and are each overall of a flat, basically plate-shaped configuration.

The molten plastic material is fed from the extruder to the distribution devices 13a, 13b by way of feed passages 17a, 17b which extend substantially in the production direction 2 and which extend on the central axis 18 of the mould cavity formed by the corrugator moulding jaws and can be of comparatively large cross-section. Those feed passages 17a, 17b each terminate at an intake opening 20 of the corresponding distribution device 13a, 13b from which the distribution passages then extend (see FIG. 2).

While the feed passage 17a ends at the centre of the first distribution device 13a (for the outside wall 11), the second feed passage 17b passes through the first distribution device 13a eccentrically in the form of a bore 21 in the plate 15. The bore 21 passes through the plate 15 eccentrically at a spacing relative to the intake opening 20, but is arranged in the central region of the plate 15, which is not covered by the annular plate 16. The bore 21 is thus arranged in the cross-sectional region of the central aperture in the annular plate 16. There is therefore no need to provide a separate aligned bore in the annular plate 16.

The feed passage 17b which in that way passes eccentrically through the distribution device 13a extends in the spacer block 19 arranged between the distribution device 13a and the distribution device 13b arranged downstream thereof in the production direction. In passing through the spacer block 19, the feed passage 17b has a portion which is directed inclinedly relative to the central axis, and finally opens into an end portion, arranged on the central axis 18, into the central intake opening 20 of the distribution device 13b.

Provided outside the central axis 18 in the two distribution devices 13a and 13b is a respective aperture 22 through which for example supply lines for power, air or water can be passed to the cooling or calibrating bar or mandrel 9. The aperture 22 is arranged at a suitable position like the bore 21 eccentrically at a spacing relative to the intake opening 20 in the distribution plate 15, more specifically in alignment in each distribution device 13a, 13b, so that the supply lines can be passed parallel in displaced relationship with the central axis 18. The aperture 22 is arranged in each case in a bore in the plate 15 at a spacing relative to the intake opening 20. It passes through the plate 15 in a region near the centre so that the aperture 22 is arranged in each case in the cross-sectional region of the central opening in the annular plate 16 and there is therefore no need for a separate bore in the annular plate 16.

Figure 2:
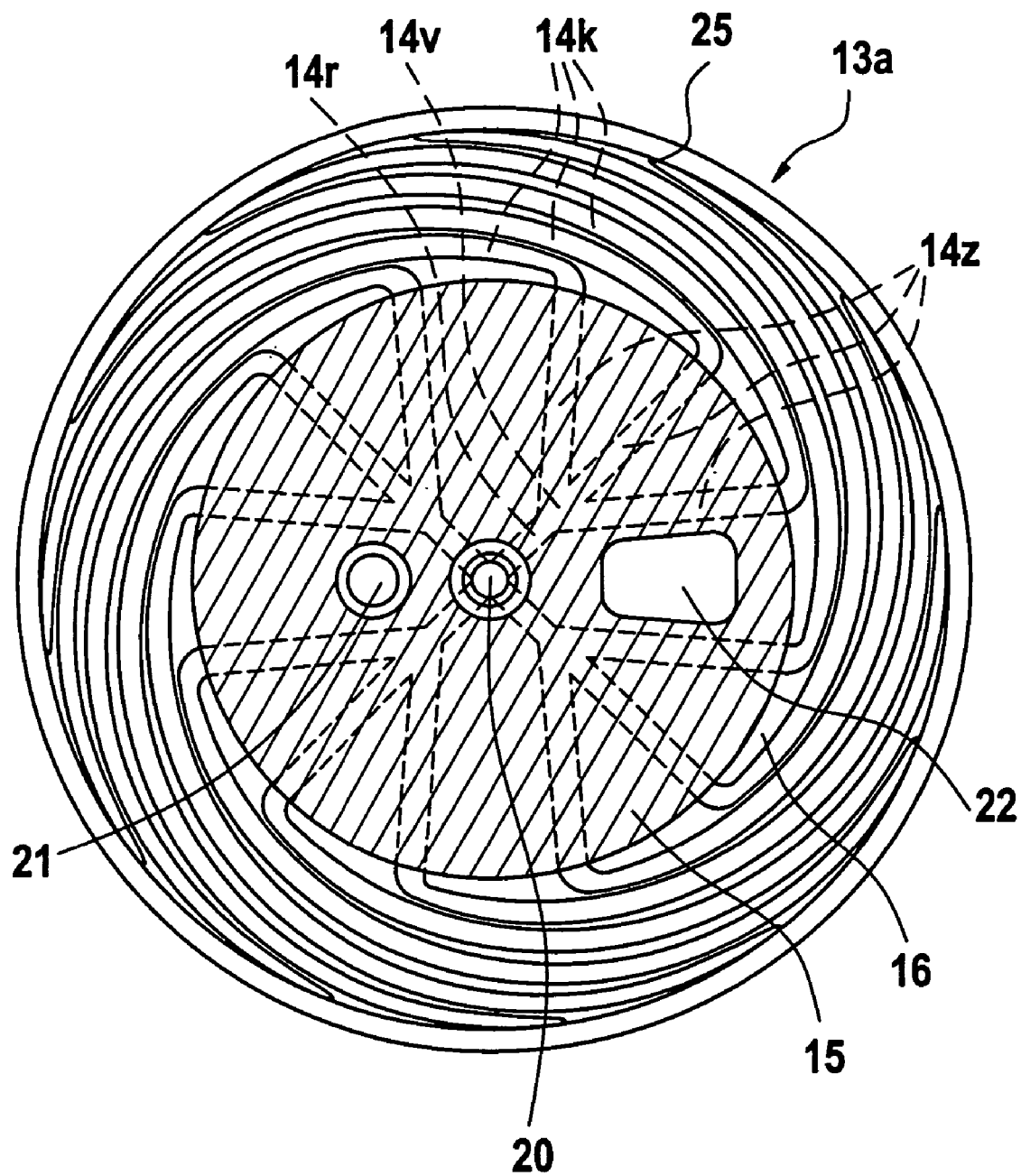
FIG. 2 shows a plan view of the downstream part of a distribution device corresponding to II—II in FIG. 1, FIG. 3 diagrammatically shows an apparatus for producing a double-wall corrugated tube using two extruders, and FIGS. 4 and 5 diagrammatically show two different arrangements for producing double-wall corrugated tubes, issuing from one extruder.

FIG. 2 diagrammatically illustrates an example of the way in which the distribution passages 14 can be arranged in the distribution device 13a.

The distribution passages 14 are arranged in the distribution device 13a in a basically star-shaped configuration. All distribution passages 14 have their origin in the central opening 20 and extend in a plane A which is perpendicular to the central axis 18, towards the periphery of the distribution device 13a in order finally to open into the annular gap 25. The annular gap 25 is formed between the peripheral surface 24 of the plate 15 and the radial inside of the outer ring 26 and it goes directly into the adjoining nozzle, at the discharge end of which the annular gap 4 is formed.

Each distribution passage 14 comprises a first radially directed straight passage portion 14r which extends from the intake opening 20 to a branch location 14v. In the branch location 14v the radial passage portion 14r branches into three branch passage portions 14z which are also straight and which then each go into passage portions 14k which are in the form of a circular arc and which are arranged in side-by-side relationship in the manner of a distributor turning means arranged in the plane A, and each end at the peripheral surface 24 of the plate 15, by opening there into the annular gap 25.

The illustrated embodiment has four radial passage portions 14r. They are arranged in crossed relationship with each other, wherein adjacent passages portions 14r are each arranged at an angle of 90°. The branch locations 14v all lie on a circular line concentric with the intake opening 20. This means that the radial passage portions 14r are each of the same length.

As already indicated above, in the illustrated embodiment, three branch passage portions 14z extend from each branch location 14v, that is to say each radial passage portion 14r forms a transition at the branch location 14v into three respective straight branch passage portions 14z. They each end on a circular line concentric with the intake opening 20, by forming a transition there into the arcuate passage portions 14k. Of the respective three branch passage portions 14z of each radial passage portion 14r, the central branch passage portion 14z extends in radially directed aligned relationship with the radial passage portion 14r. The two outer passage portions 14z extend on both sides of the central branch passage portion 14z directed in each case at an angle of 45° relative thereto. The central branch passage portion 14z is shorter in each case than the two outer branch passage portions 14z. In the illustrated embodiment, that is achieved by virtue of the fact that the ends of the branch passage portions 14z are respectively arranged on a concentric circular line, the centre point of which is on the axis of the intake opening 20 and is thus displaced with respect to the branch location 14v. The two outer passage portions 14z are each of the same length by virtue of the arrangement which is symmetrical relative to the radially directed central branch passage portion. In order to provide that a volume flow of equal magnitude issues at the end of each of the three branch passage portions 14z, the diameter of the shorter central branch passage portion 14z is smaller in each case than the diameter of the two longer outer passage portions 14z. The relative diameters are so selected that the different lengths and the different flow paths, related thereto, of the branch passage portions 14z are compensated, and thus a volume flow of the same magnitude is fed in each case by each branch passage portion into the arcuate passage portions 14k. In addition to or as an alternative to that compensation by way of a suitable choice of the diameters involved, modified embodiments can provide that there is also a corresponding different constriction or enlargement in the branch passage portions 14z to compensate for the differing lengths of the passage portions. Alternatively, in further modified embodiments, it can be provided that, to adapt the length of the flow paths, the branch passage portions 14z are not of an identically rectilinear configuration or preferably the two outer branch passage portions 14 are straight but the central branch passage portion 14z is not straight. In addition, to provide the compensation effect, the arcuate passage portions 14k could also have corresponding constrictions or enlargements or could be designed to have different increases or reductions in length.

In order to achieve optimum distribution with a respectively identical volume flow in the region of the ends of the distribution passages 14, which open into the annular passage 25, the diameters of the radial passage portions 14r are identical to each other.

In the illustrated embodiment the diameter of all radial passage portions 14r is identical and is constant over the entire length of the passage portion 14r. The straight adjoining middle one of the two passage portions 14z is of the same respective diameter as the passage portion 14r, while the diameter of that branch passage portion 14z is also constant over the entire length thereof. The diameter of each of the two lateral longer passage portions 14z is larger than the diameter of the central passage portion 14z and is also constant over the entire length of the lateral branch passage portions 14z. The arcuate passage portions 14k adjoining the branch passage portions 14z are identical to each other. Their non-round cross-sectional area corresponds in regard to the surface area to the cross-sectional area of the lateral branch passage portions 14z. The surface area of the cross-sectional areas of those arcuate passage portions 14k decreases towards the mouth opening into the annular passage 25, as can be seen from FIG. 1. In modified embodiments it can be provided that the diameter of the radial passage portions and/or the diameter of the branch passage portions 14z decreases towards the annular gap 25 over the length of the respective passage portion. The decrease can be continuous over the length of the passage portions in question.

While the passage portions 14r and 14z within the first distribution plate 15 are in the form of bores arranged parallel to the plane of the plate, the arcuate passage portions 14k are formed by arcuate grooves being formed in the annular plate 16 on the side towards the contact surface with the plate 15, with those grooves being covered by the plate surface, which rests thereon in that region, of the first distribution plate 15. The arcuate grooves are so arranged in the annular plate 16 that, when the plates are assembled together, the ends, that is to say the discharge openings of the branch passage portions 14z in the first plate, each open therein. For that purpose the plate 15 is in the form of a stepped plate with a central portion and an outer ring step, wherein the ends of the branch passage portions open in the peripheral surface of the central portion. The outer annular plate 16 which is stepped in a complementary fashion has an inner ring step and an outer ring portion, wherein the grooves forming the arcuate passage portions 14k are formed in the outer ring portion. In the assembled condition of the stepped plate 15 and the annular plate 16, the arcuate passage portions are formed by the outer ring step of the plate 15 being supported on the grooves of the outer annular portion of the plate 16. In this case the branch passage portions 14z each open into the respective arcuate passage portions 14k which therefore in that way each continue the respective distribution passages. In the construction of the illustrated embodiment, there are 14 branch passage portions 14z and 14 arcuate passage portions 14k.

The arcuate configuration of the passage portions 14k, as is shown in FIG. 2, in conjunction with the annular gap 25 formed along the peripheral surface 24 of the first plate 15, has the action of a turning distributor, wherein the selected arrangement provides that the molten plastic material which flows by way of the distribution passage portions 14r to 14k experiences both a turning impulsion in the peripheral direction and also an impulsion in the radial direction. The described configuration of the end portions 14k of the distribution passages 14, which can essentially be seen from FIG. 2, provides that the individual partial flows of plastic material which are each of the same magnitude and which issue from the end portions 14k mix together very well and a highly homogeneous, tubular flow of plastic material is produced in the gap 25 between the peripheral surface 24 of the plate 15 and the outer ring 26; the tubular flow of plastic material then correspondingly issues into the actual discharge annular gap 4 or, in the case of the distribution device 13b, into the annular gap 7, and forms the respective tube walls 11 and 12 respectively.

The configuration of the passage portions 14k, as is shown in FIG. 2, in conjunction with the annular gap 25 formed along the peripheral surface 24 of the annular plate 16, has the action of a turning distributor, wherein the selected arrangement provides that the molten plastic material which flows by way of the distribution passage portions 14r, 14z, 14k experiences both a turning impulsion in the peripheral direction and also an impulsion in the radial direction. The described configuration of the end portions 14k of the distribution passages, which can essentially be seen from FIG. 2, provides that the individual partial flows of plastic material which are each of the same magnitude and which issue from the end portions 14k mix together very well and a highly homogeneous, tubular flow of plastic material is produced in the gap 25 between the peripheral surface 24 of the plate 16 and the outer ring 26; the tubular flow of plastic material then correspondingly issues into the actual discharge annular gap 4 or, in the case of the distribution device 13, into the annular gap 7, and forms the respective tube walls 11 and 12 respectively.

It will be seen from FIG. 1 that the end faces of the distribution devices 13a and 13b remain substantially free. In that way it is possible to use very massive and solid fixing means for the distribution devices 13a and 13b, thereby permitting tidy adjustment and a correspondingly stable holding effect. FIG. 1 further shows that the cross-section of the distribution devices can be overall kept smaller than the diameter of the annular gaps 4 and 7 respectively. In that way it is possible for annular distribution of the plastic material to be disposed overall within the cross-section of the mould cavity 19 and for the holding effect also to extend far into the mould cavity.

It is also possible to use distribution devices corresponding to the distribution devices 13a and 13b respectively of the illustrated embodiment, if only a single-layer tube is to be produced. In that case, only one single distribution device is required. It will be appreciated that the distribution devices can also be used if tubes of a different kind, for example smooth seamless tubes, are to be produced. In that case it is also not absolutely necessary to provide travelling moulding jaws. Here, under some circumstances, it would be possible to operate with a stationary outer mould and a corresponding core or mandrel portion.

Figure 3:
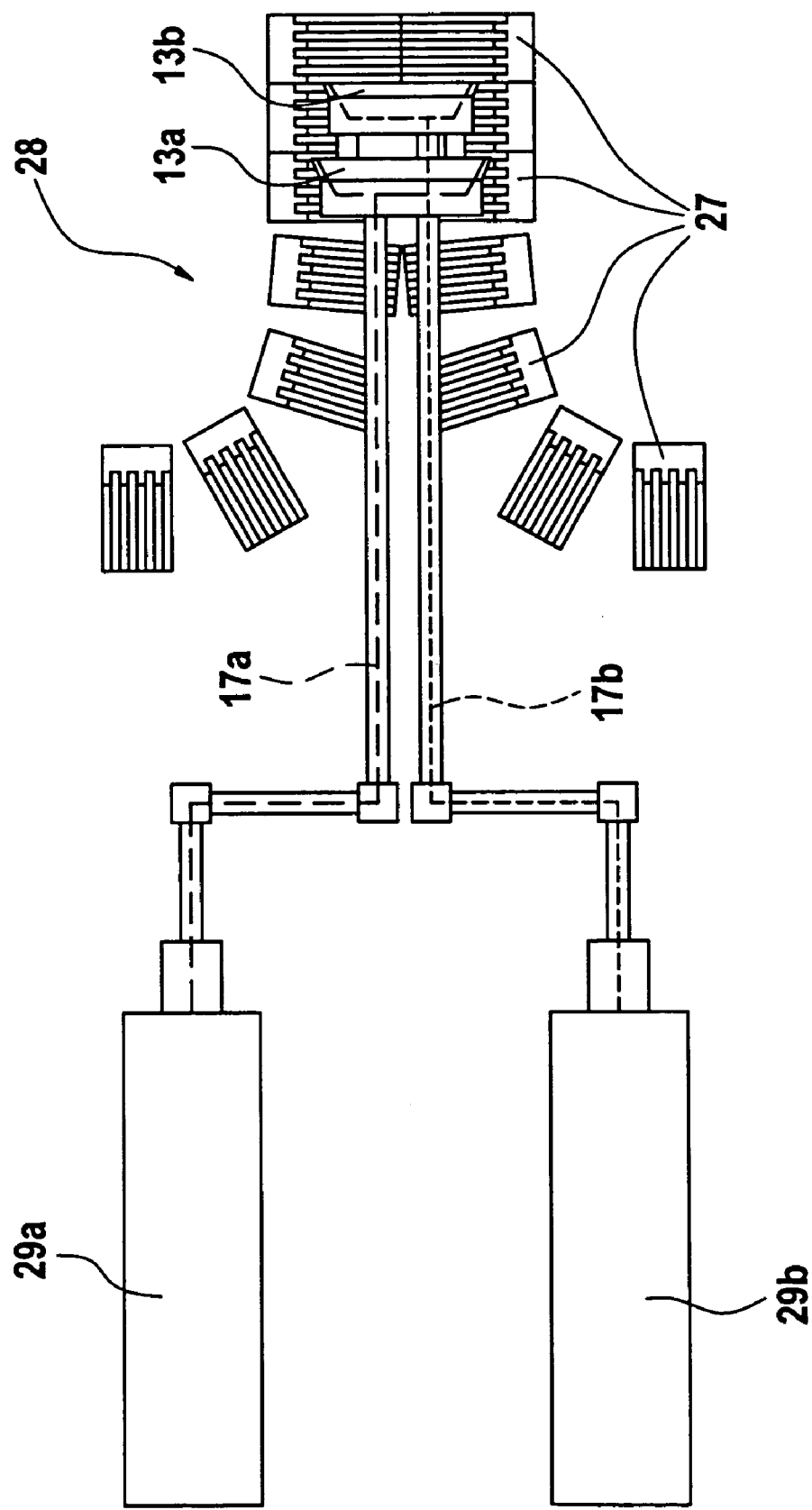
Figure 4:
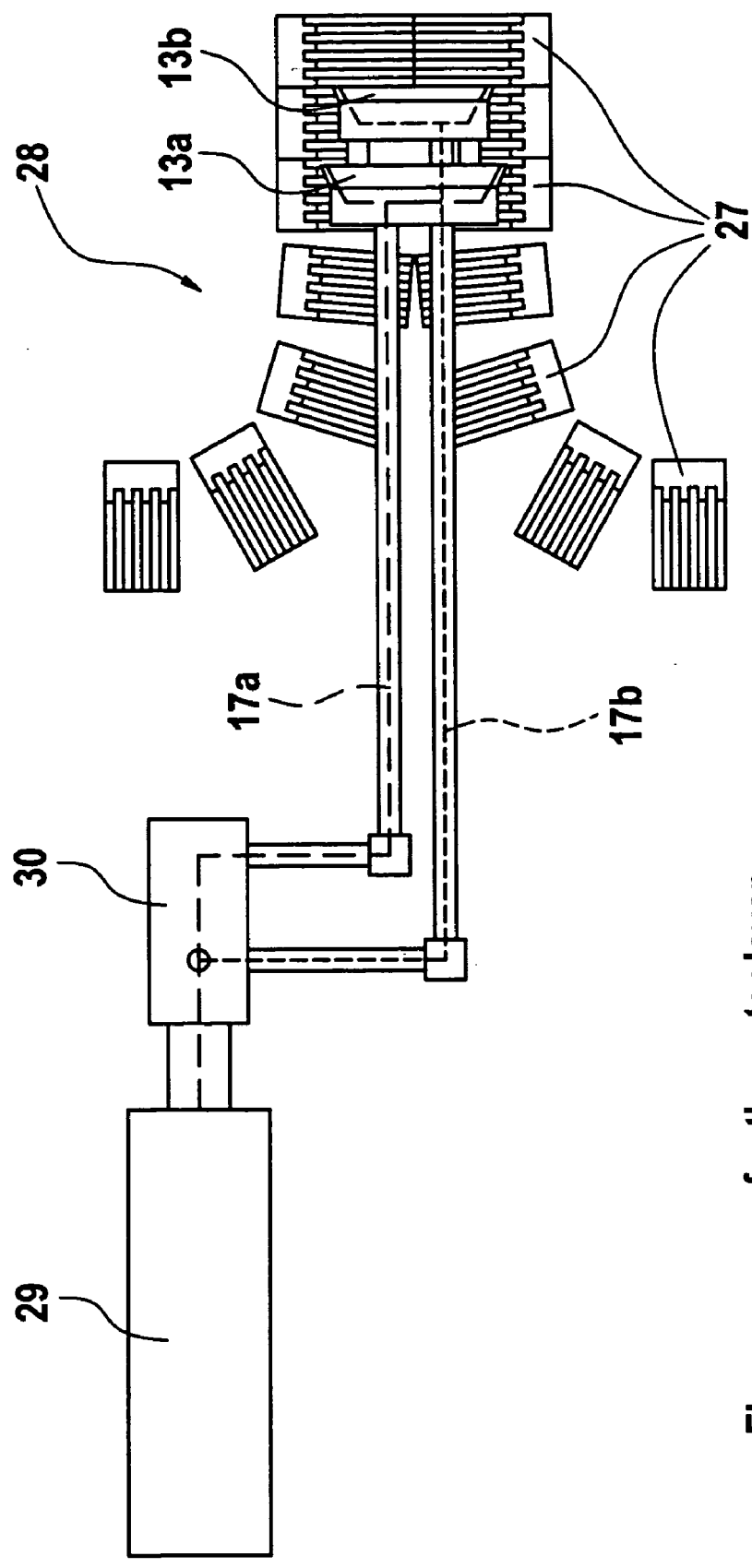
Figure 5:
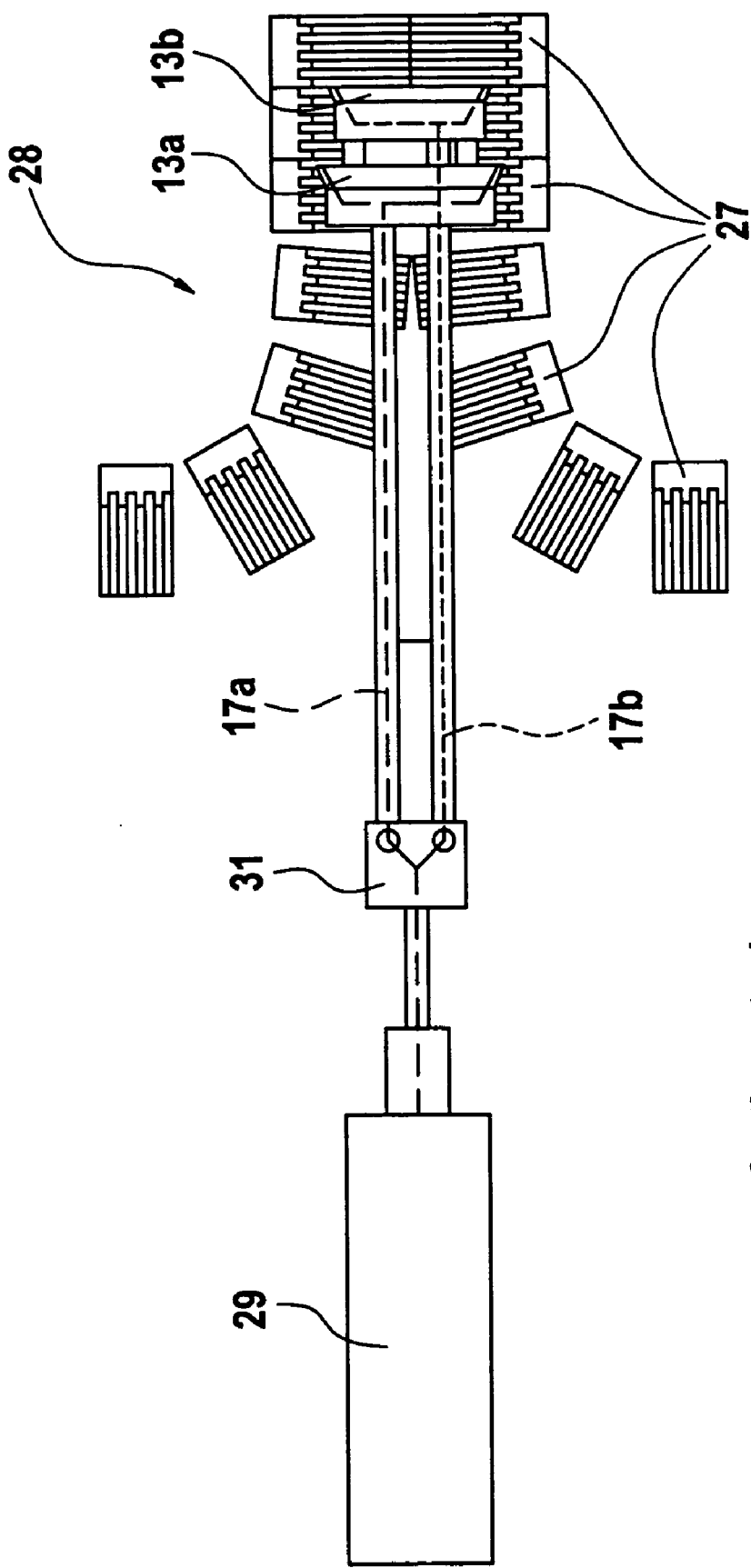

FIGS. 3 to 5 show diagrammatic views of arrangements illustrating the way in which apparatuses for producing corrugated tubes can be designed, using the concept of the invention, that is to say using the special distribution devices.

FIGS. 3 to 5 each show at the right a movable mould 28 formed by circulating moulding jaw halves 27. Arranged in that movable mould 28, in a manner corresponding to the embodiment of FIG. 1, are two distribution devices 13a, 13b which are fed with material by way of feed passages 17a, 17b.

In the embodiment shown in FIG. 3, the inside and outside walls of the multi-layer corrugated tube are produced from different plastic materials. Accordingly the apparatus also has two extruders, more specifically an extruder 29a which supplies the molten plastic material for the outside wall 11 and an extruder 29b for producing the molten plastic material for the inside wall 12.

The embodiments of FIGS. 4 and 5 are admittedly also used to produce double-wall corrugated tubes. It will be seen however that the inside and outside walls are to comprise the same material, for which reason the arrangement has only one extruder 29.

The difference between the embodiments of FIGS. 4 and 5 now essentially lies in the manner of distribution to the two feed passages 17a and 17b, of the flow of plastic material which issues from the extruder 29.

While the embodiment of FIG. 4 has a conventional distribution box 30 which is connected to the distribution devices 13a, 13b by way of comparatively long feed passages 17a, 17b, the embodiment of FIG. 5 provides that distribution of the flow of plastic material issuing from the extruder 29 takes place by way of a Y-distributor 31 which is directly adjoined by the feed passages 17a and 17b. Such an arrangement would not be conceivable with the conventional art, because it is not possible to produce tubular flows of molten material which extend concentrically relative to each other by means of a Y-distributor. The configuration shown in FIG. 5 therefore represents a quite considerable simplification in relation to the hitherto conventional design.

As can be seen from the foregoing description, because of the short extent of the distribution device in the production direction 2, during distribution of the molten material in the radial direction, the flow of molten material has no or only very slight speed vectors in the production direction, which has an advantageous effect on the corresponding mixing action and tube-formation effect. It would even be possible for the distribution passages to be of such a configuration and arrangement that negative speed vectors prevail within the distribution passages in relation to the production direction 2, that is to say the molten material is moved in the opposite direction to the production direction.

As a consequence of the small structural height, stability, and possible variations therefore the described apparatus offers a large number of possible options for influencing the properties of tubes produced with the apparatus, in dependence on the plastic material used.

The invention claimed is:

1. Apparatus for producing seamless plastic tubes, comprising
    at least one extrusion device,
    at least one injection head connected downstream of the extrusion device in the production direction, with at least one annular gap which is preferably in the form of a circular ring, and
    at least one mould cavity which is connected downstream of the injection head in the production direction and which is formed for example by travelling corrugator jaws and which is coaxial with the annular gap, for shaping the plastic tube from at least one flow of molten plastic material which issues from the annular gap of the injection head,
    wherein it is provided that
    the injection head has a plate-shaped distribution device which is arranged within the cross-section of the mould cavity and which has an intake opening into which a feed passage for the molten plastic material opens,
    wherein the distribution device has a plurality of distribution passages which extend in a star configuration from the intake opening and which extend substantially perpendicularly to the axis of the mould cavity and/or the annular gap,
    wherein each distribution passage has a straight, radial passage portion which extends from the intake location and preferably branch passages which extend from a branch location at the end of the radial passage portion,
    wherein a total of n ends of the distribution passages open in the region of the periphery of the distribution device into the annular gap at a respectively identical angular spacing between adjacent ends at an angle of 360°/n, forming n flow paths which each extend from the intake opening in mutually adjoining passage portions of the distribution passages to open into the annular gap and introduce respectively equal volume flows into the annular gap,
    characterised in that
    at least two of the flow paths are of different lengths and to ensure that an equal volume flow is introduced into the annular gap (25, 4, 7) the configuration of the passage portions (14z) associated with those two flow paths is different in terms of the flow cross-section.

2. Apparatus according to claim 1
    characterised in that over the entire length of a passage portion (14z) or only over a portion of the length of a passage portion, the cross-section thereof is variable, wherein the passage portion (14z, 14r) comprises a portion of the distribution passage (14), which extends (a) from the intake opening (20) to a first branch location (14v) or to the annular gap (25, 4, 7) or (b) extends from a first branch location (14v) to a second branch location and/or is a portion (14z, 14r) of the distribution passage (14) and which extends with a constant orientation.

3. Apparatus according to claim 1 or claim 2
    characterised in that the intake opening (20) is arranged coaxially with the axis (18) of the mould cavity and/or the annular gap (4, 7, 25) or the intake opening (20) is arranged at a spacing relative to said axis (18).

4. Apparatus for producing seamless plastic tubes according to claim 1 characterised in that
    the intake opening (20) is arranged in the distribution device (13a, 13b) centrally and coaxially with respect to the annular gap (4, 7, 25) and the mould cavity,
    the distribution device (13a, 13b) has distribution passages (14) which extend in a star shape from the intake opening (20) and which extend substantially perpendicular to the axis of the mould cavity or the annular gap,
    each distribution passage (14) has a straight radially directed first passage portion (14r) of equal length which extends from the intake opening (20) to a branch location (14v) wherein it branches into a plurality of branch passage portions (14z) which lead the molten plastic material to arcuate passage portions (14k) which, in the region of the periphery (24) of the distribution device (13a, 13b), respectively open into the annular gap (25) at equal angular positions relative to each other.

5. Apparatus according to claim 4 characterised in that the radial first passage portion (14r) at the branch location (14v) branches into at least three branch passage portions (14z).

6. Apparatus according to claim 5, characterised in that the branch passage portions (14z) are arranged symmetrically relative to the radial prolongation of the associated radial first passage portion (14r).

7. Apparatus according to claim 4 characterised in that the branch passage portions (14z) which branch at a branch location (14v) are respectively in the form of straight passage portions (14a).

8. Apparatus according to claim 5 characterised in that the middle one of the three branch passage portions (14z) which are branched from a radial first passage portion (14r) is arranged in radial alignment with the radial first passage portion (14r).

9. Apparatus according to claim 4 characterised in that the branch passage portions (14z) in turn further branch once or a plurality of times repeatedly into still further branch passage portions.

10. Apparatus according to claim 4 characterised in that the branch locations (14r) or the further branch locations (14v) are arranged respectively on a line which is concentric with respect to the intake opening (20) and/or the axis (18) of the annular gap (4, 7, 25) and/or the mould cavity.

11. Apparatus according to claim 4 characterised in that the radial first passage portions (14r) are arranged at a respectively identical angle relative to each other.

12. Apparatus according to claim 4 characterised in that the branch passage portions (14z) which are branched from the radial first passage portion (14r) are arranged at a respectively identical angle relative to each other and/or the further branch passage portions branched from the branch passage portion (14z) are arranged at a respectively identical angle relative to each other.

13. Apparatus according to claim 5, characterised in that four respective radial first passage portions (14r) are arranged at an angle of 90° relative to each other and the three branch passage portions (14z) branched from each radial first passage portion (14r) are respectively arranged at an angle of 45° relative to each other.

14. Apparatus according to claim 4 characterised in that the radial first passage portions (14r) are each of the same respective diameter.

15. Apparatus according to claim 5 characterised in that the diameter of the radial first passage portions (14r) is respectively smaller than the diameter of the branch passage portions (14z) which are branched therefrom.

16. Apparatus according to claim 4 characterised in the at least three branch passage portions (14z) which are branched from a radial first passage portion (14r) are of different lengths and/or are of different diameters and/or at least two further branch passage portions which are branched from a branch passage (14z) are of different lengths and/or are of different diameters.

17. Apparatus according to claim 16 characterised in that the flow cross-section are diameters, the diameter of the shorter branch passage portion (14z) is smaller than the diameter of the longer branch passage portion (14z).

18. Apparatus according to claim 16 characterised in that to connect the shorter or longer branch passage portion (14z) to one or more passage portions (14k) adjoining same, a passage portion which increases the length of the flow path or a passage portion which reduces the length of the flow path is arranged to compensate for different flow paths.

19. Apparatus according to claim 4 characterised in that the distribution device (13a, 13b) has a distribution plate (15) in which the radial first passage portions (14r) and/or the branch passage portions (14z) are formed as bores (14r, 14z) extending parallel to the plane of the plate.

20. Apparatus according to claim 19 characterised in that the distribution device (13a, 13b) has a first distribution plate (15) and a second distribution plate (16), wherein arranged in the second distribution plate (16) are portions of the distribution passages (14k).

21. Apparatus according to claim 19 characterised in that the distribution device (13a, 13b) has a first distribution plate (15) and a second distribution plate (16) which lies thereon at least in a portion-wise manner and at least portions of the distribution passages (14k) are in the form of grooves in at least one of the plates (16) and the grooves in said plate (16) are covered by the respective other plate (15) which rests thereon at least in said region, forming the distribution passage portions (14k).

22. Apparatus according to claim 20 characterised in that the passage portions (14k) are arcuate and are arranged in an annular distribution plate (16) and the intake opening (20) and at least in a portion-wise manner the radial first passage portions (14r) are arranged in a central distribution plate (15) which is arranged surrounded by the annular distribution plate (16).

23. Apparatus according to claim 22 characterised in that the central distribution plate (15) and/or the annular distribution plate (16) has or have a concentric stepping and the two plates (15, 16) are arranged to lie against each other in complementary relationship in respect of the stepping.

24. Apparatus according to claim 4 characterised in that the distribution device (13a) eccentrically has an aperture (21) for a feed passage (17b) for molten plastic material to a distribution device (13b) connected downstream in the production direction.

25. Apparatus according to claim 4 characterised in that the distribution device (13a, 13b) eccentrically has an aperture (22) for supply conduits (22), for example a line for air, power or coolant.

* * * * *